(12) United States Patent
Watanabe (10) Patent No.: US 11,072,077 B2
(45) Date of Patent: Jul. 27, 2021

(54) ROBOT SYSTEM AND OPERATION METHOD THEREOF

(71) Applicant: KAWASAKI JUKOGYO KABUSHIKI KAISHA, Kobe (JP)

(72) Inventor: Masayuki Watanabe, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 303 days.

(21) Appl. No.: 16/060,312

(22) PCT Filed: Dec. 2, 2016

(86) PCT No.: PCT/JP2016/005052
§ 371 (c)(1),
(2) Date: Jun. 7, 2018

(87) PCT Pub. No.: WO2017/098713
PCT Pub. Date: Jun. 15, 2017

(65) Prior Publication Data
US 2018/0354140 A1 Dec. 13, 2018

Related U.S. Application Data

(60) Provisional application No. 62/263,795, filed on Dec. 7, 2015.

(51) Int. Cl.
*B25J 9/00* (2006.01)
*B25J 13/00* (2006.01)
(Continued)

(52) U.S. Cl.
CPC .............. *B25J 13/003* (2013.01); *B25J 9/06* (2013.01); *B25J 9/161* (2013.01); *B25J 9/1661* (2013.01); *B25J 9/1666* (2013.01)

(58) Field of Classification Search
CPC ........ B65D 88/52; B65D 25/30; B65D 85/32; B65D 88/10; B65D 25/005;
(Continued)

(56) References Cited

U.S. PATENT DOCUMENTS

| 4,896,357 A | 1/1990 | Hatano et al. |
| 2001/0047265 A1 | 11/2001 | Sepe |

(Continued)

FOREIGN PATENT DOCUMENTS

| DE | 3723329 A1 | 1/1988 |
| DE | 100 26 263 A1 | 3/2001 |

(Continued)

OTHER PUBLICATIONS

JP 11010580 English Translation (Year: 1999).*

(Continued)

*Primary Examiner* — Ian Jen
(74) *Attorney, Agent, or Firm* — Oliff PLC (57) ABSTRACT

A robot system which includes a robot with a plurality of joints; a voice operation device to which a voice operation command is input by an operator; and a controller which controls an operation of the robot, the controller being configured to change the operation of the robot, in a case where the voice operation device detects a voice with a sound volume which is equal to or higher than a first predetermined sound volume which is preset, during the operation of the robot.

16 Claims, 9 Drawing Sheets

(51) Int. Cl.
B25J 9/06 (2006.01)
B25J 9/16 (2006.01)

(58) Field of Classification Search
CPC B65D 11/1833; B65D 88/524; B65D 11/184; B65D 88/522
See application file for complete search history.

(56) References Cited

U.S. PATENT DOCUMENTS

| | | |
|---|---|---|
| 2006/0145647 A1 | 7/2006 | Kitatsuji et al. |
| 2012/0290121 A1 | 11/2012 | Gronbach |
| 2015/0039128 A1* | 2/2015 | Oaki ................ B25J 9/1641 700/253 |
| 2016/0114483 A1 | 4/2016 | Ishikawa et al. |

FOREIGN PATENT DOCUMENTS

| | | |
|---|---|---|
| JP | S58-177294 A | 10/1983 |
| JP | S59-090597 U | 6/1984 |
| JP | S62-165209 A | 7/1987 |
| JP | H11-10580 A | 1/1999 |
| JP | H11-245191 A | 9/1999 |
| JP | 2003-080482 A | 3/2003 |
| JP | 2006-187826 A | 7/2006 |
| JP | 2008-49462 A | 3/2008 |
| JP | 2010-162619 A | 7/2010 |
| JP | 2012-234549 A | 11/2012 |
| JP | 2013-071231 A | 4/2013 |
| JP | 2016-083713 A | 5/2016 |

OTHER PUBLICATIONS

JP 58177294 English Translation (Year: 1983).*
J 62165209 English Translation (Year: 1987).*
JP 2003080482 English Translation (Year: 2003).*
JPH 11245191 English Translation (Year: 1999).*
Jan. 24, 2017 Search Report issued in International Patent Application No. PCT/JP2016/005052.

* cited by examiner

ROBOT SYSTEM AND OPERATION METHOD THEREOF

TECHNICAL FIELD

The present invention relates to a robot system, and an operation method thereof.

BACKGROUND ART

For example, in a situation where the robot falls down, in an environment in which a robot and a person coexist, it is necessary to stop the robot urgently. A system for urgently stopping the robot in this situation is known (e.g., see Patent Literature 1).

In an emergency stop (shut-down) system of the robot disclosed in Patent Literature 1, a degree of reliability with which it is determined that an input sound/acoustic signal is a shout (cry, yell) based on acoustic characteristics of the shout is evaluated, and the operation (movement) of the robot is urgently stopped in a case where this degree of reliability is higher than a predetermined evaluation reference value.

CITATION LIST

Patent Literature

Patent Literature 1: Japanese Laid-Open Patent Application Publication No. 2016-83713

Patent Literature 2: Japanese Laid-Open Patent Application Publication No. 2013-71231

SUMMARY OF INVENTION

Technical Problem

However, in the emergency stop system of the robot disclosed in Patent Literature 1, an attention is paid to the fact that "shout" such as "Stooooop !" or "Freeeeeze!" which is frequently used to notify a person of an emergency contains a vowel which is strung out. Therefore, there is a possibility that this system cannot address a shout such as "A!" which does not contain a vowel which is strung out.

In addition, there is a possibility that the emergency stop system of the robot disclosed in Patent Literature 1 cannot address a noise generated in a case where the robot collides with an obstacle or a case where equipment in the vicinity of the robot falls down.

The present invention has been developed to solve the above-described problem, and an object of the present invention is to provide a robot system and an operation method of the robot system which can suppress the operation of a robot in response to a loud voice such as a shout of a person such as an operator, or a big sound such as a collision noise of the robot, or the like.

Solution to Problem

To solve the above-described problem, according to the present invention, there is provided a robot system comprising: a robot including a plurality of joints; a voice operation device to which a voice operation command is input by an operator; and a controller which controls an operation of the robot, the controller being configured to suppress the operation of the robot, in a case where the voice operation device detects a voice with a sound volume which is equal to or higher than a first predetermined sound volume which is preset, during the operation of the robot.

In accordance with this configuration, it becomes possible to suppress the operation of the robot in response to a loud voice such as a shout of a person such as the operator, or a big sound such as a collision noise of the robot, or the like.

According to the present invention, there is provided a method of operating a robot system, the robot system including: a robot including a plurality of joints; and a voice operation device to which a voice operation command is input by an operator, the method comprising: (A) suppressing an operation of the robot, in a case where the voice operation device detects a voice with a sound volume which is equal to or higher than a first predetermined sound volume which is preset, during the operation of the robot.

In accordance with this method, it becomes possible to suppress the operation of the robot in response to a loud voice such as a shout of a person such as an operator, or a big sound such as a collision noise of the robot, or the like.

Advantageous Effects of Invention

In accordance with a robot system and an operation method of the robot system, it becomes possible to suppress the operation of a robot in response to a loud voice such as a shout of a person such as an operator, or a big sound such as a collision noise of the robot, or the like.

DESCRIPTION OF EMBODIMENTS

Hereinafter, embodiments of the present invention will be described with reference to the drawings. Throughout the drawings, the same or corresponding constituents are designated by the same reference symbols, and will not be described in repetition. Throughout the drawings, the constituents required to describe the present invention are extracted, and the other constituents are not shown, in some cases. The present invention is not limited to the embodiments described below.

Embodiment 1

A robot system according to Embodiment 1 comprises a robot including a plurality of joints; a voice operation device to which a voice operation command is input by an operator, and a controller which controls an operation of the robot, the controller being configured to suppress the operation of the robot, in a case where the voice operation device detects a voice with a sound volume which is equal to or higher than a first predetermined sound volume which is preset, during the operation of the robot.

In the robot system according to Embodiment 1, the controller may be configured to operate the robot at a speed which is lower than a preset first speed, in a case where the voice operation device detects the voice with the sound volume which is equal to or higher than the first predetermined sound volume, during the operation of the robot.

In the robot system according to Embodiment 1, the controller may be configured to stop the operation of the robot, in a case where the voice operation device detects the voice with the sound volume which is equal to or higher than the first predetermined sound volume, during the operation of the robot.

Hereinafter, an example of a robot system according to Embodiment 1 will be described with reference to FIGS. 1 to 4.

[Configuration of Robot System]

Figure 1:
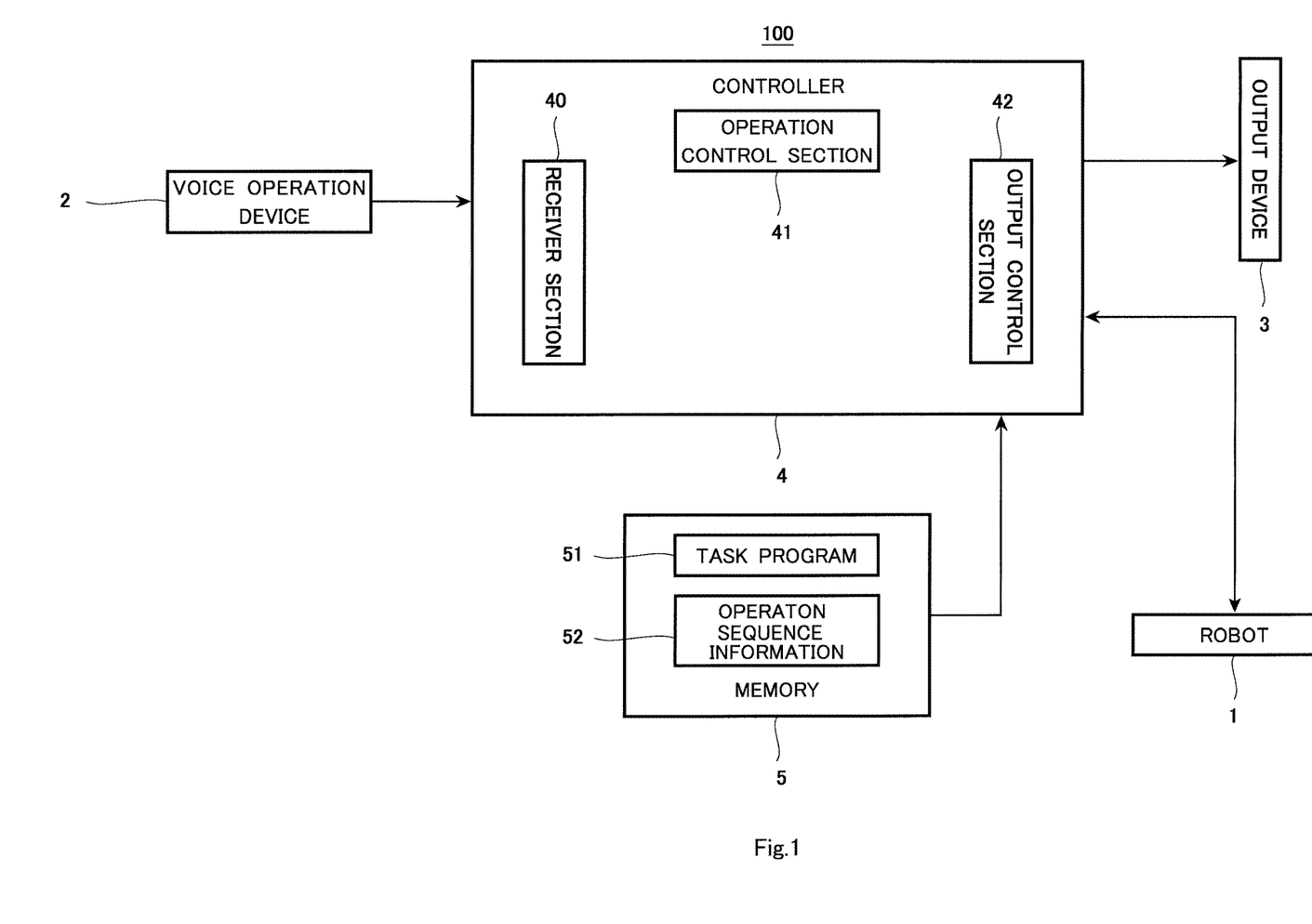
FIG. 1 is a block diagram showing the schematic configuration of a robot system according to Embodiment 1.
Figure 2:
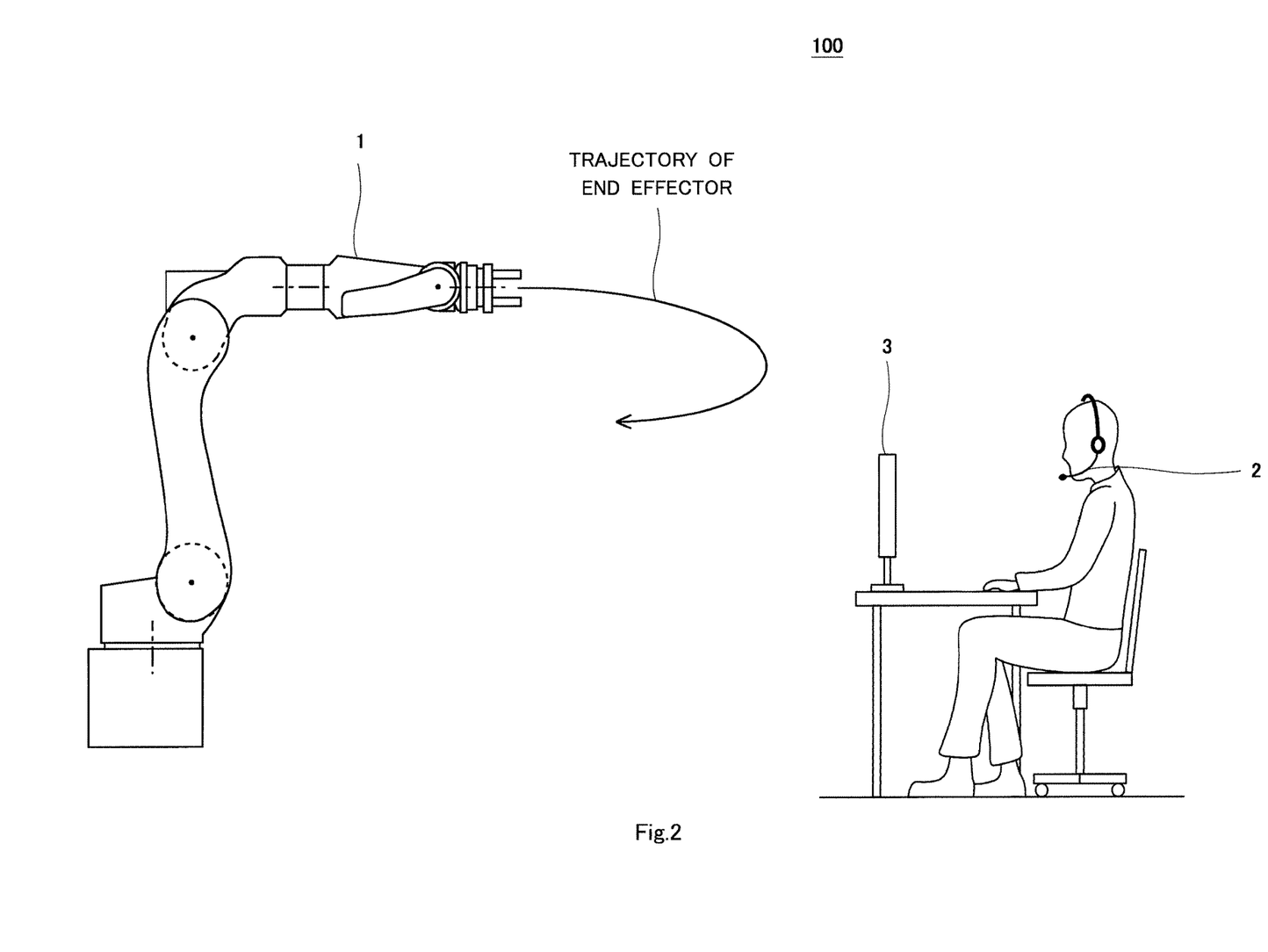
FIG. 2 is a view showing the schematic configuration of the robot system according to Embodiment 1.

FIG. 1 is a block diagram showing the schematic configuration of the robot system according to Embodiment 1. FIG. 2 is a view showing the schematic configuration of the robot system according to Embodiment 1.

As shown in FIGS. 1 and 2, a robot system 100 according to Embodiment 1 includes a robot 1, a voice operation device 2, an output device 3, a controller 4, and a memory 5. The controller 4 is configured to suppress the operation of the robot 1, in a case where the voice operation device 2 detects a voice with a sound volume which is equal to or higher than a first predetermined sound volume which is preset, during the operation of the robot 1.

Herein, a control mode in which the robot 1 operates according to a preset task program is referred to as "automatic operation mode." As in a conventional teaching playback robot, in the automatic operation mode, the robot 1 automatically performs a predetermined work operation without an operator's operation (manipulation) of the voice operation device 2, a teaching pendant, or the like.

Also, herein, a control mode in which the robot 1 operates in accordance with a command input to the voice operation device 2, the teaching pendant, or the like, by the operator's operation (manipulation) will be referred to as "manual operation mode." Further, herein, a control mode in which the operation of the robot 1 operating in accordance with the preset task program is modified in accordance with the command input to the voice operation device 2, the teaching pendant, or the like, by the operator's operation (manipulation) will be referred to as "modified automatic operation mode."

Hereinafter, the constituents of the robot system 100 according to Embodiment 1 will be described in detail.

The robot 1 is a robot which is placed in a work space and performs a series of work operations including a plurality of steps. As examples of the series of work operations including the plurality of steps, there are mounting parts to a product, paint application to the product, and the like.

The robot 1 according to Embodiment 1 is a multi joint (articulated) robot which is used in a production plant in which electric/electronic components (parts) are assembled into the product by a line production method or a cell production method, is placed on a work table provided in the production plant, and is capable of at least one of transferring workpieces on the work table, mounting parts to the workpieces, changing the positions of the workpieces, changing the postures of the workpieces, and the like. It should be noted that how the robot 1 is used is not limited to the above uses, and the present invention is widely applicable to multi-joint robots including a horizontal multi joint (articulated) robot and a vertical multi joint (articulated) robot.

Now, the specific configuration of the robot 1 will be described with reference to FIG. 3.

Figure 3:
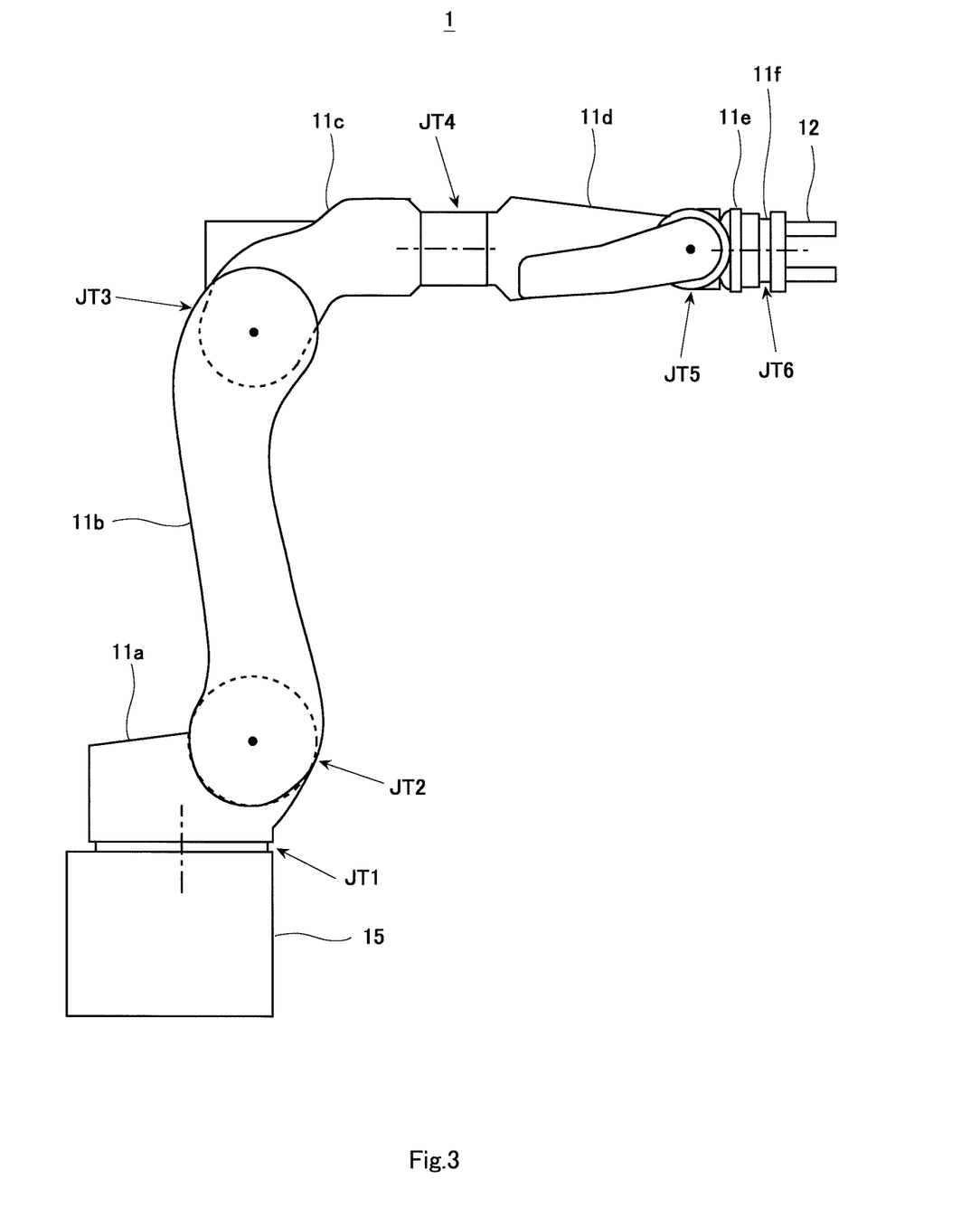
FIG. 3 is a view showing the schematic configuration of a robot of FIGS. 1 and 2.

FIG. 3 is a view showing the schematic configuration of the robot of FIGS. 1 and 2.

As shown in FIG. 3, the robot 1 includes an articulated section including a plurality of link members (first link member 11a to sixth link member 11f in the present embodiment), a plurality of joints (first joint JT1 to sixth joint JT6 in the present embodiment), and a base 15 which supports these members.

The base end portion of the first link member 11a is coupled to the base 15 by the first joint JT1 to enable rotation around a shaft (axis) extending vertically. The tip end portion of the first link member 11a is coupled to the base end portion of the second link member 11b by the second joint JT2 to enable rotation around a shaft (axis) extending horizontally. The tip end portion of the second link member 11b is coupled to the base end portion of the third link member 11c by the third joint JT3 to enable rotation around a shaft (axis) extending horizontally.

The tip end portion of the third link member 11c is coupled to the base end portion of the fourth link member 11d by the fourth joint JT4 to enable rotation around a shaft (axis) extending in the lengthwise direction of the fourth link member 11d. The tip end portion of the fourth link member 11d is coupled to the base end portion of the fifth link member 11e by the fifth joint JT5 to enable rotation around a shaft (axis) extending in a direction perpendicular to the lengthwise direction of the fourth link member 11d. The tip end portion of the fifth link member 11e is coupled to the base end portion of the sixth link member 11f by the sixth joint JT6 to enable twist rotation.

A mechanical interface is attached on the tip end portion of the sixth link member 11f. An end effector 12 corresponding to a work operation content is detachably mounted on the mechanical interface.

The first joint JT1 to sixth joint JT6 are provided with driving motors (not shown), respectively, as an actuator which relatively rotates two members coupled to each other by each joint. The driving motors may be, for example, servo motors which are servo-controlled by the controller 4. The first joint JT1 to sixth joint JT6 are provided with rotation sensors (not shown) which detect the rotation positions of the driving motors, respectively, and current sensors (not shown) which detect currents used to control the rotations of the driving motors, respectively. The rotation sensors may be, for example, encoders.

The voice operation device 2 is a device to which a voice operation command is input by the operator. In a case where the robot 1 operates in the manual operation mode or the modified automatic operation mode, or teaching is performed for the robot 1, the operator inputs to the voice operation device 2 an operation command value of position information, posture information, movement direction, movement speed, or the like, of the robot 1, in the form of a voice (give a voice operation command). Then, the voice operation device 2 outputs the input operation command value to the controller 4. The voice operation device 2 is, for example, a sound collector microphone disposed in the work space in which the robot 1 is placed. Alternatively, as shown in FIG. 2, the voice operation device 2 may be a head set including a microphone and a headphone, which is attached on the head part of the operator.

The output device 3 is, for example, a display device such as a monitor, a speaker, or the like. For example, in a case where the output device 3 is the display device, the output device 3 displays (outputs) on (to) outside of the controller 4, information sent from the controller 4 as a video picture such as textures, graphic, image, or moving picture. In a case where the output device 3 is the speaker, the output device 3 outputs the information sent from the controller 4 as voice information.

The memory 5 is a storage medium which allows data to be written in and read from. The memory 5 contains therein a task program 51 and operation sequence information 52 of the robot system 100. Although in the robot system 100 according to Embodiment 1, the memory 5 is provided separately from the controller 4, the memory 5 may be integrated with the controller 4.

For example, the task program 51 is created in such a manner that the operator performs teaching by use of the voice operation device 2. The task program 51 is stored in the memory 5 to correspond to identification information of the robot 1 and a task. Alternatively, the task program 51 may be created as an operation flow for each work operation. Further, the task program 51 may be created by teaching performed by use of the teaching pendant.

The operation sequence information 52 is defined as information relating an operation sequence defining a series of work operations steps to be performed by the robot 1 in the work space. In the operation sequence information 52, an operation order of the work operation steps corresponds to the control mode of the robot 1. In the operation sequence information 52, a task program for causing the robot 1 to automatically perform each work operation corresponds to the work operation step. Note that the operation sequence information 52 may contain a program for causing the robot 1 to automatically perform the work operation of each work operation step.

The controller 4 is configured to control the operation of the robot 1. The controller 4 includes as functional blocks, a receiver section 40, an operation control section 41, and an output control section 42. For example, the controller 4 may include a processor (not shown) including a micro controller, MPU, PLC (programmable logic controller), a logic circuit, or the like, and a memory section (not shown) including ROM, RAM or the like. The functional blocks included in the controller 4 can be implemented in such a manner that the processor of the controller 4 reads and executes the program stored in the memory section or the memory 5.

The controller 4 may be a single controller, or a controller group in which a plurality of controllers cooperatively control the robot 1 (robot system 100).

The receiver section 40 is configured to receive input signals which are sent from the outside of the controller 4, and to send output signals from the controller 4 to the robot 1 or the like. The input signals received by the receiver section 40 include, for example, a signal sent from the voice operation device 2, a signal sent from an operation commanding section (not shown) which is other than the voice operation device 2, a position signal (position information) of the robot 1 which is sent from the rotation sensor of the robot 1, etc.

In a case where the receiver section 40 receives the operation command from the voice operation device 2 as the input signal, the operation control section 41 is configured to determine the operation mode to be set for the work operation step performed by the robot 1, of the series of work operations, in a response to this operation command as a trigger. The operation control section 41 is configured to determine the operation mode to be set for the work operation step performed next by the robot 1, with reference to the operation sequence information 52 stored in the memory 5. After the operation control section 41 determines the operation mode, the operation control section 41 is configured to operate the robot 1 in the determined operation mode.

For example, in a case where the operation control section 41 determines that the robot 1 should be operated in the automatic operation mode, the operation control section 41 is configured to control the robot 1 to perform an operation defined by the task program 51 or perform an operation defined by a program contained in the operation sequence information 52 read by the operation control section 41.

In a case where the operation control section 41 determines that the robot 1 should be operated in the manual operation mode, the operation control section 41 is configured to control the robot 1 to perform an operation in accordance with the operation command received by the receiver section 40 from the voice operation device 2.

In a case where the operation control section 41 determines that the robot 1 should be operated in the modified automatic operation mode, the operation control section 41 is configured to cause the robot 1 to perform the operation defined by the task program 51, or to cause the robot 1 to perform the operation defined by the program contained in the operation sequence information 52 read by the operation control section 41, and to modify the operation of the robot 1 in the automatic operation mode into the operation in accordance with a modification command signal received from the voice operation device 2, in a case where the receiver section 40 receives the modification command signal as the input signal from the voice operation device 2 while the robot 1 is operating in the automatic operation mode.

Then, in a case where the voice operation device 2 ceases to output the modification command signal and the receiver section 40 ceases to receive the modification command signal, or a case where the receiver section 40 receives a signal directing resuming the automatic operation of the robot 1 from the voice operation device 2, the operation control section 41 is configured to resume the automatic operation of the robot 1.

The output control section 42 is configured to control the output device 3 to output information provided to the operator or the like, as video information, image information, voice (audio) information, or the like. Specifically, for example, the output control section 42 is configured to control the output device 3 to output operation suppressing information output from the operation control section 41, indicating that the operation of the robot 1 is suppressed.

[Operation and Advantages of Robot System]

Next, the operation and advantages of the robot system 100 according to Embodiment 1 will be described with reference to FIGS. 1 to 4. The operation performed by the robot 1 to perform a series of work operations in response to a command provided by the operator's operation (manipulation) of the voice operation device 2 is the same as that of a known robot system, and will not be described in detail. The following operation takes place in such a manner that the processor of the controller 4 reads the program stored in the memory section of the controller 4 or the memory 5 and executes this program.

Figure 4:
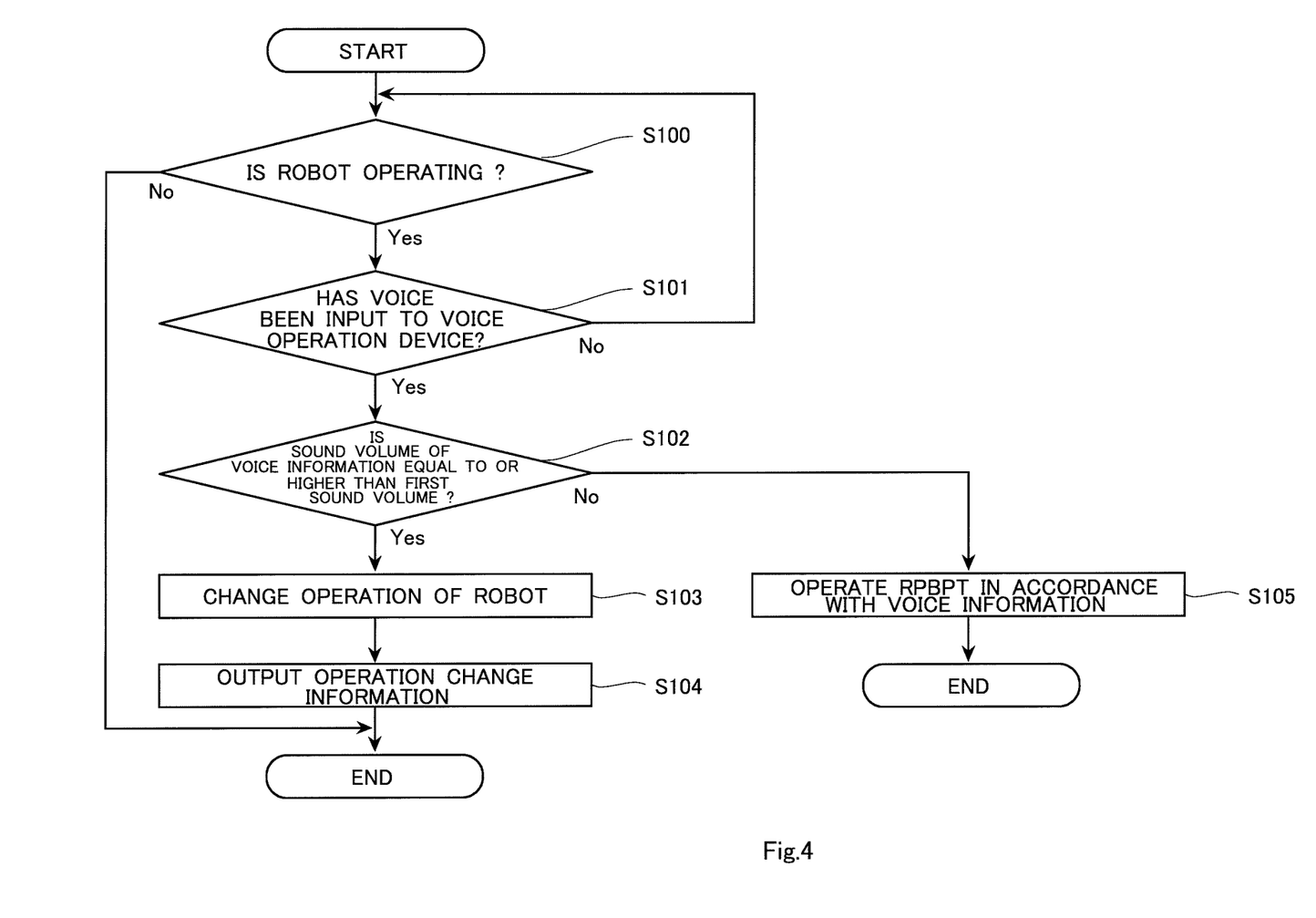
FIG. 4 is a flowchart showing an example of the operation of the robot system according to Embodiment 1.

FIG. 4 is a flowchart showing an example of the operation of the robot system according to Embodiment 1.

As shown in FIG. 4, the operation control section 41 of the controller 4 determines whether or not the robot 1 is operating (step S100).

In a case where the operation control section 41 of the controller 4 determines that the robot 1 is not operating (No in step S100), the operation control section 41 terminates the present program. In a case where the controller 4 terminates the present program, the controller 4 executes the present program again, after passage of, for example, 50 msec. On the other hand, in a case where the operation control section 41 of the controller 4 determines that the robot 1 is operating (Yes in step S100), the operation control section 41 performs step S101.

In step S101, the operation control section 41 of the controller 4 determines whether or not the operator has input a voice (voice command) to the voice operation device 2.

Specifically, the operation control section 41 of the controller 4 determines whether or not the voice information has been input from the voice operation device 2 to the receiver section 40.

In a case where the operation control section 41 of the controller 4 determines that the operator has not input a voice to the voice operation device 2 (No in step S101), the operation control section 41 returns to step S100, and repeats step S100 and step S101 until the operator inputs a voice. On the other hand, in a case where the operation control section 41 of the controller 4 determines that the operator has input a voice to the voice operation device 2 (Yes in step S101), the operation control section 41 performs step S102.

In step S102, the operation control section 41 of the controller 4 determines whether or not the voice information input to the voice operation device 2 in step S101 has a sound volume which is equal to or higher than a first predetermined sound volume which is preset.

The first predetermined sound volume can be set in advance by an experiment or the like. The first predetermined sound volume is suitably changed, depending on a noise in a space in which the operator wearing the voice operation device 2 is present, or a noise in the work space in which the voice operation device 2 is placed. The first predetermined sound volume may be set to 65 to 90 dB. Alternatively, the first predetermined sound volume may be set to a value which is a sum of 5 dB and a maximum value of the noise in the space in which the operator wearing the voice operation device 2 is present, or in the work space in which the voice operation device 2 is placed.

In a case where the operation control section 41 of the controller 4 determines that the voice information input to the voice operation device 2 in step S101 has a sound volume which is equal to or higher than the first sound volume (Yes in step S102), the operation control section 41 changes the operation of the robot 1 (step S103). Then, the operation control section 41 of the controller 4 directs the output control section 42 to cause the output device 3 to output operation change information (step S104), and terminates the present program. The output device 3 may output the operation change information in such a way that texture information such as "operation of robot is changed" is output to (displayed on) the monitor or the like, or the texture information is output as the voice information from the speaker or the like.

For example, the operation of the robot 1 may be changed by suppressing the operation of the robot 1. For example, the operation of the robot 1 may be suppressed by reducing the operation speed of the robot 1. Specifically, for example, the robot 1 may operate at a speed lower than a first speed.

For example, the first speed may be 25 to 35% of a maximum speed (degree/sec) of each joint of the robot 1, and may be 25 to 35% of a maximum speed (mm/sec) of a movement speed (movement speed of the end effector 12 or the workpiece) of the robot 1 when the robot 1 moves the workpiece. In a case where the robot 1 moves the workpiece on a straight line or a curved line, the movement speed (movement speed of the end effector 12 or the workpiece) of the robot 1, which is the first speed may be, for example, 250 to 350 mm/sec.

For example, the operation of the robot 1 may be suppressed by stopping the robot 1, or inverting the operation direction of the robot 1.

The phrase "inverting the operation direction of the robot 1" refers to, for example, "the robot 1 operates in a direction opposite to the direction in which the robot 1 was operating before (just before) the voice information with the first sound volume or higher is input to the voice operation device 2, and the driving motors attached on the joints constituting the robot 1 rotate in an opposite direction. More specifically, the robot 1 (end effector 2) is caused to move in a rearward direction, in a case where the robot 1 is moving in a forward direction.

For example, the operation of the robot 1 may be changed in such a way that the robot 1 is controlled to reduce gains of the driving motors (servo motors) of the robot 1, in a case where the operation control section 41 of the controller 4 is performing a feedback control for the robot 1.

Further, the operation of the robot 1 may be changed in such a way that only the operation of the robot 1 to which the command is input by the voice operation device 2 is changed, or the operations of all of the robots 1 placed in the work space are suppressed.

On the other hand, in a case where the operation control section 41 of the controller 4 determines that the voice information input to the voice operation device 2 in step S101 is lower than the first sound volume (No in step S102), the operation control section 41 modifies the operation of the robot 1 based on the voice information input to the voice operation device 2 in step S101 (step S105), and terminates the present program.

In the robot system 100 according to Embodiment 1 configured as described above, the controller 4 is configured to change the operation of the robot 1, in a case where the voice operation device 2 detects the voice with the sound volume which is equal to or higher than the first sound volume, during the operation of the robot 1.

In accordance with this configuration, in a case where a failure occurs in the operation of the robot 1 and a person such as the operator emits a loud voice such as a shout, or a case where a big sound such as a collision noise of the robot 1 or other devices occurs, the operation of the robot 1 is changed in response to such a voice or sound.

In addition, in the robot system 100 according to Embodiment 1 configured as described above, the controller 4 is configured to change the operation of the robot 1, in a case where the voice operation device 2 detects the voice with the sound volume which is equal to or higher than the first sound volume, and to cause the output device 3 to output the operation change information, during the operation of the robot 1.

This makes it possible to notify the operator or the like other than the operator who shouted that the operation of the robot 1 has been changed.

Embodiment 2

In a robot system according to Embodiment 2, the voice operation device includes a switching unit which enables or disenables a voice operation command from the operator, in the robot system according to Embodiment 1, and the controller is configured to change the operation of the robot, even in a state in which the switching unit disenables the voice operation command input to the voice operation device, in a case where the voice operation device detects a voice with a sound volume which is equal to or higher than the first sound volume, during the operation of the robot.

Hereinafter, an example of the robot system according to Embodiment 2 will be described with reference to FIGS. 5 and 6.

[Configuration of Robot System]

Figure 5:
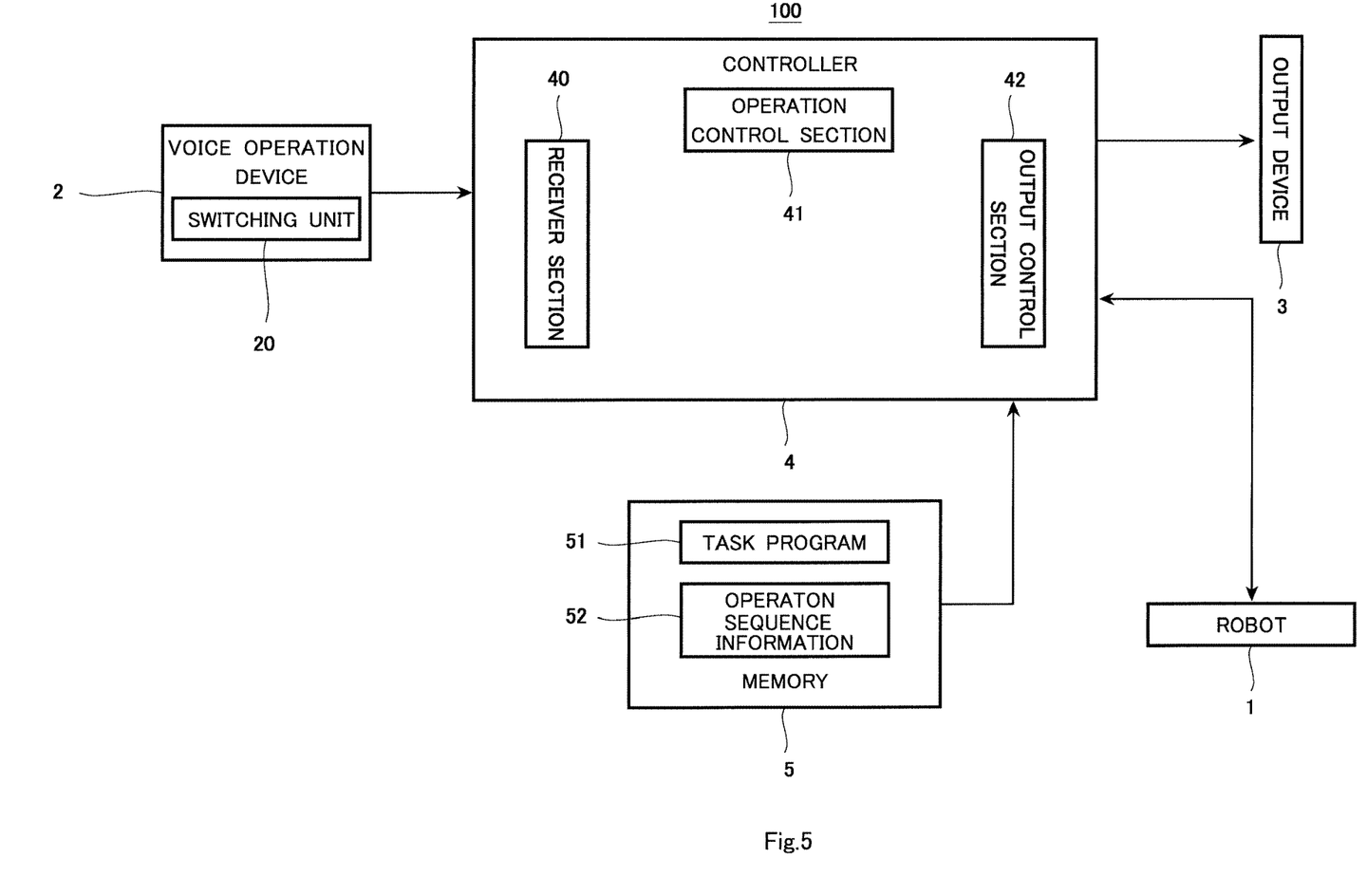
FIG. 5 is a block diagram showing the schematic configuration of a robot system according to Embodiment 2.

FIG. 5 is a block diagram showing the schematic configuration of the robot system according to Embodiment 2.

As shown in FIG. 5, the basic configuration of the robot system 100 according to Embodiment 2 is the same as that of the robot system 100 according to Embodiment 1 and is different from the same in that the voice operation device 2 includes a switching unit 20 which enables or disenables a voice command input to the voice operation device 2 by the operator. Note that the output device 3 may output information indicating enable/disenable the voice command which is selected by the switching unit 20.

[Operation and Advantages of Robot System]

Figure 6:
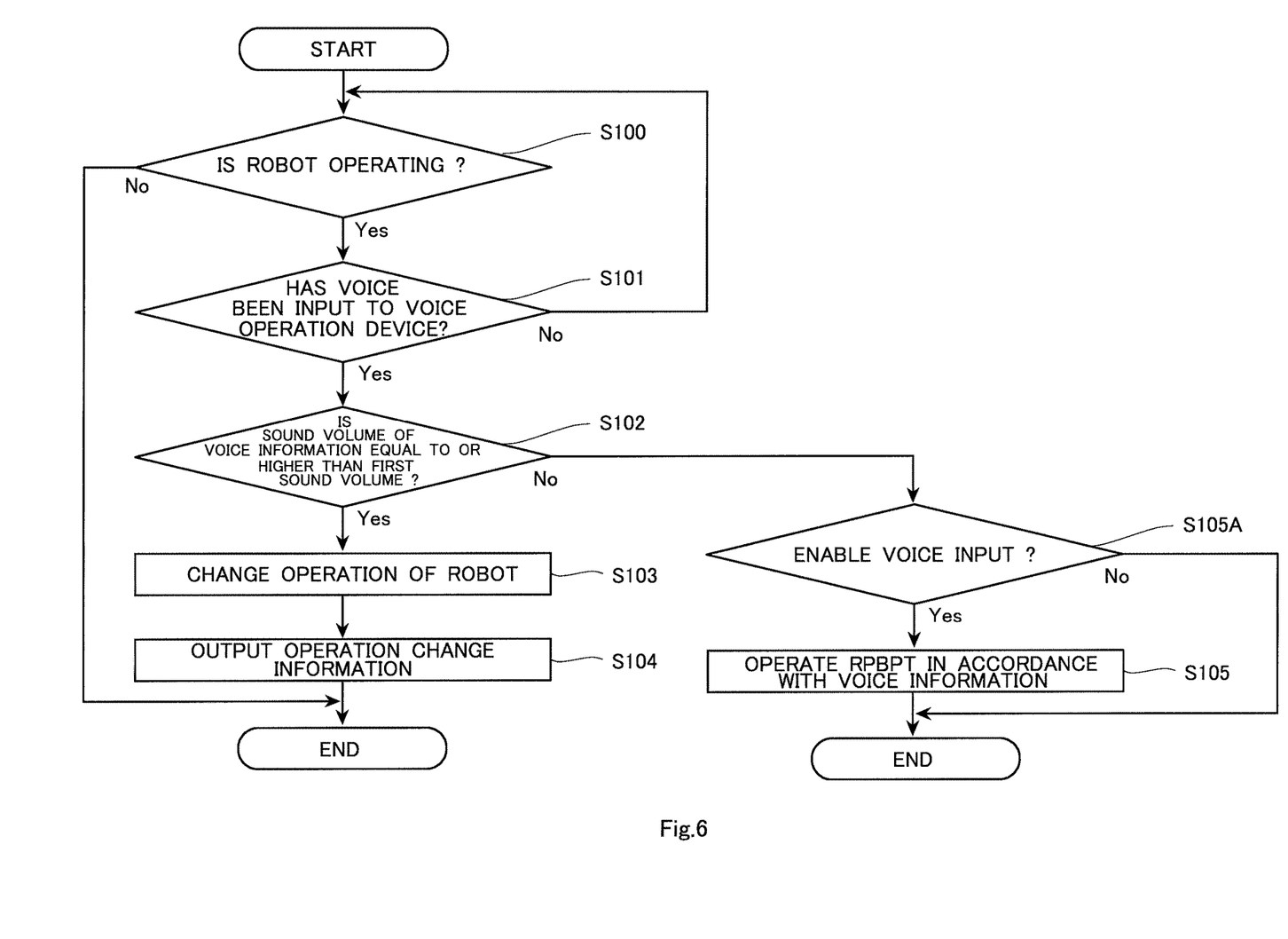
FIG. 6 is a flowchart showing an example of the operation of the robot system according to Embodiment 2.

FIG. 6 is a flowchart showing an example of the operation of the robot system according to Embodiment 2. The following operation takes place in such a manner that the processor of the controller 4 reads the program stored in the memory section of the controller 4 or the memory 5 and executes this program.

As shown in FIG. 6, the basic operation of the robot system 100 according to Embodiment 2 is the same as that of the robot system 100 according to Embodiment 1 and is different from the same in that step S105A is performed before step S105 is performed.

Specifically, in a case where the operation control section 41 of the controller 4 determines that the voice information input to the voice operation device 2 in step S101 has a sound volume which is lower than the first sound volume (No in step S102), the operation control section 41 determines whether or not the switching unit 20 enables the voice command input to the voice operation device 2 by the operator (step S105A).

In a case where the operation control section 41 of the controller 4 determines that the voice operation device 2 enables the voice command input by the operator (Yes in step S105A), the operation control section 41 modifies the operation of the robot 1 based on the voice information input to the voice operation device 2 in step S101 (step S105), and terminates the present program.

On the other hand, in a case where the operation control section 41 of the controller 4 determines that the voice operation device 2 disenables the voice command input by the operator (No in step S105A), the operation control section 41 terminates the present program.

The robot system 100 according to Embodiment 2 configured as described above can obtain the same advantages as those of the robot system 100 according to Embodiment 1.

In particular, in the robot system 100 according to Embodiment 2, the controller 4 is configured to change the operation of the robot 1, irrespective of a state in which the voice operation device 2 enables or disenables the voice input by the operator, in a case where the voice operation device 2 detects a voice with a sound volume which is equal to or higher than the first sound volume, during the operation of the robot 1.

In this configuration, in a case where a person such as the operator emits a loud voice such as a shout, or a big sound such as a collision noise of the robot 1 or other devices occurs, even in a state in which the voice operation device 2 disenables the voice input by the operator, the operation of the robot 1 is changed in response to such a voice or sound.

Embodiment 3

A robot system according to Embodiment 3 further comprises a voice output device in the robot system according to Embodiment 1 or 2, wherein the controller is configured to execute a sound volume detection test in such a manner that the controller causes the voice output device to output a voice with a sound volume which is equal to or higher than the first sound volume, the controller determines that the voice operation device is operating normally, in a case where the voice operation device detects the voice with the sound volume which is equal to or higher than the first sound volume, and the controller determines that the voice operation device is not operating normally (the voice operation device has an abnormality), in a case where the voice operation device detects a voice with a sound volume which is lower than the first sound volume.

Hereinafter, an example of the robot system according to Embodiment 3 will be described with reference to FIGS. 7 and 8.

[Configuration of Robot System]

Figure 7:
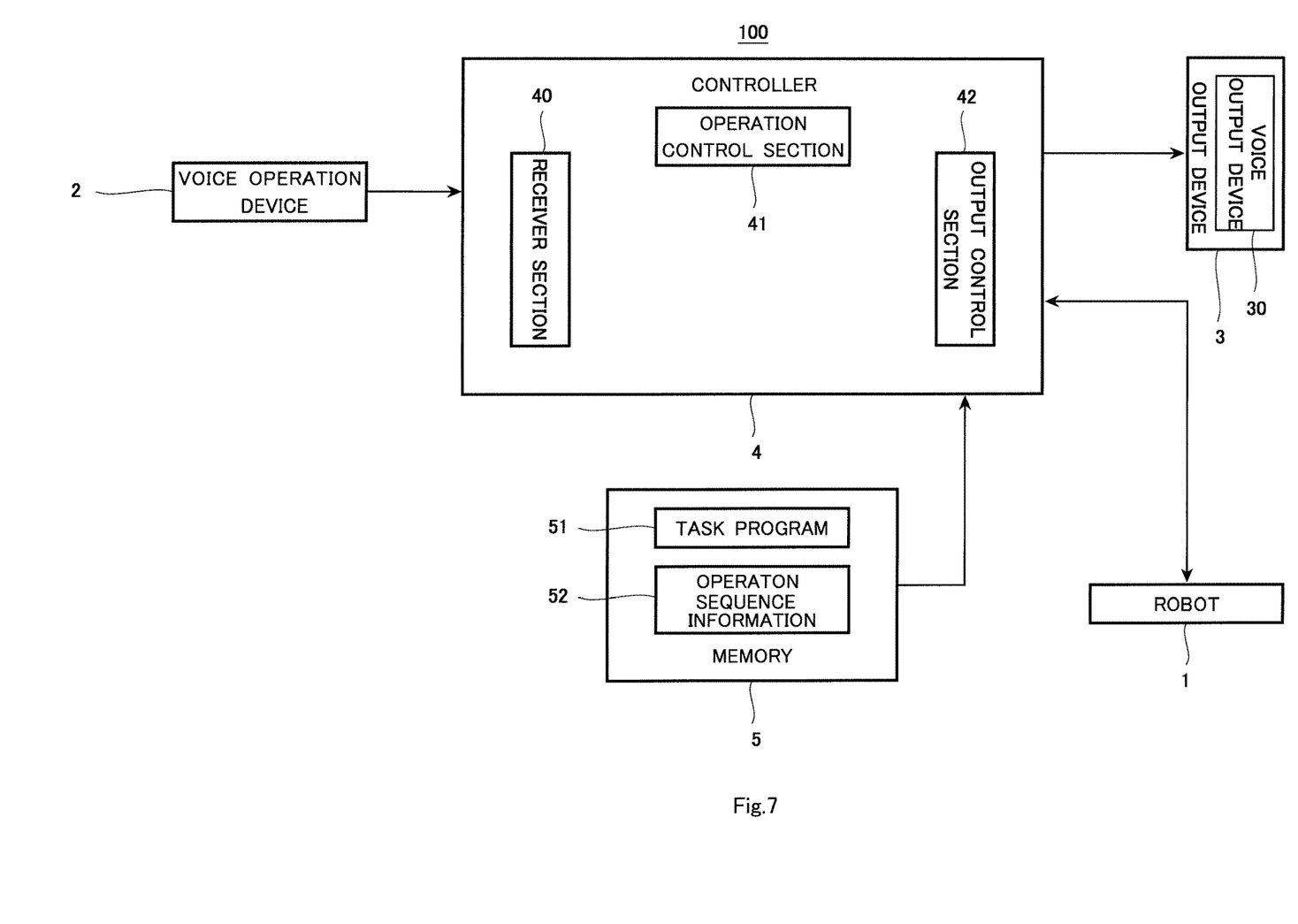
FIG. 7 is a block diagram showing the schematic configuration of a robot system according to Embodiment 3.

FIG. 7 is a block diagram showing the schematic configuration of a robot system according to Embodiment 3.

As shown in FIG. 7, the basic configuration of the robot system 100 according to Embodiment 3 is the same as that of the robot system 100 according to Embodiment 1 and is different from the same in that the output device 3 includes a voice output device 30. The voice output device 30 is, for example, a speaker.

[Operation and Advantages of Robot System]

Figure 8:
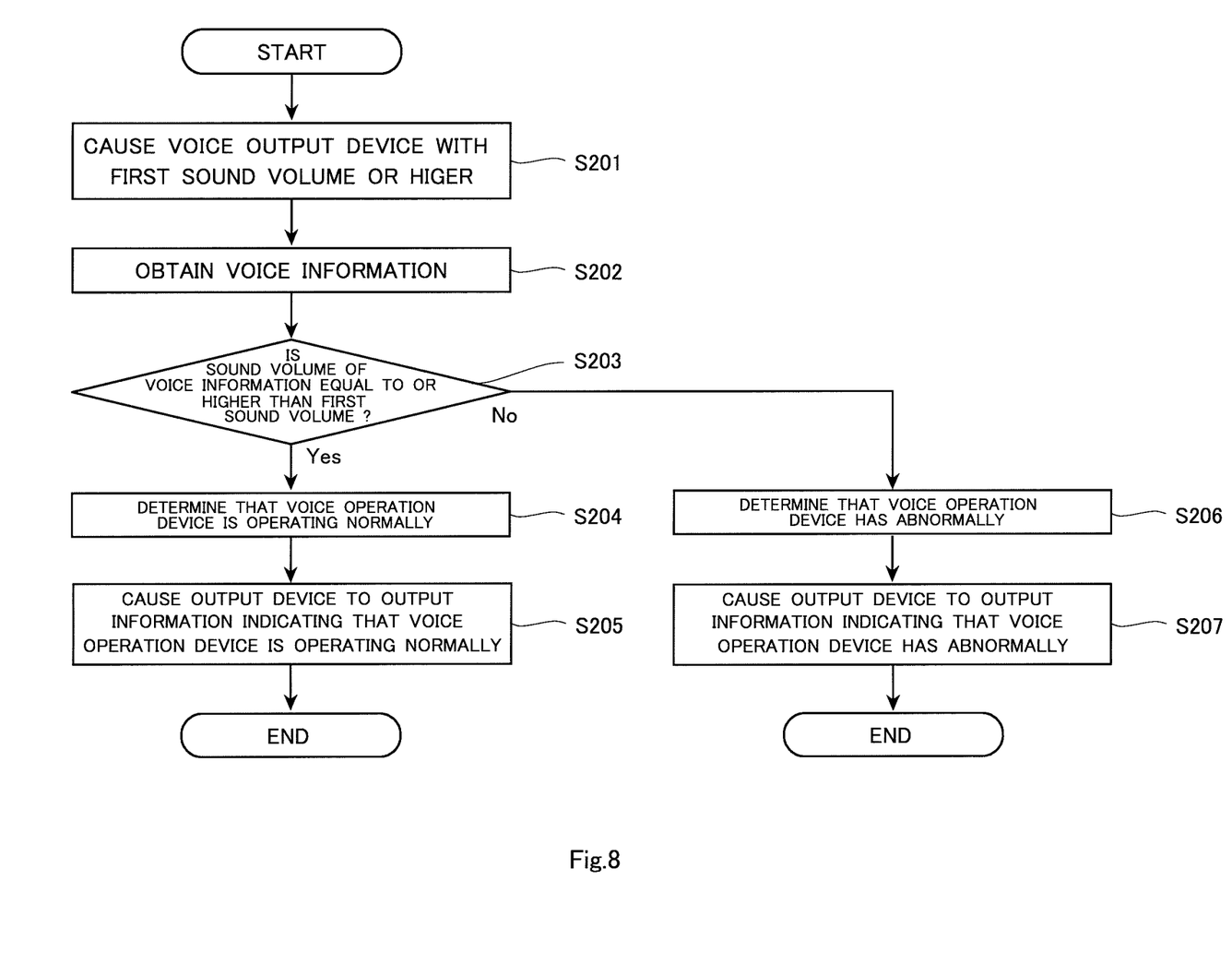
FIG. 8 is a flowchart showing an example of the operation of the robot system according to Embodiment 3.

FIG. 8 is a flowchart showing an example of the operation of the robot system according to Embodiment 3. The following operation takes place in such a manner that the processor of the controller 4 reads the program stored in the memory section of the controller 4 or the memory 5 and executes this program.

As shown in FIG. 8, the operation control section 41 of the controller 4 directs the output control section 42 to cause the voice output device 30 to output a voice with a sound volume which is equal to or higher than the first sound volume (step S201). Specifically, the operation control section 41 of the controller 4 causes the memory 5 to pre-store voice information such as a shout (cry, yell) of a person, reads this voice information from the memory 5, and causes the voice output device 30 to output this voice information.

For example, in a case where a distance between the voice operation device 2 and the voice output device 30 is large, or an obstacle is present between the voice operation device 2 and the voice output device 30, the operation control section 41 of the controller 4 may cause the voice output device 30 to output a voice with a sound volume which is higher than the first sound volume so that a voice with a sound volume which is equal to or higher than the first sound volume is input to the voice operation device 2.

Then, the operation control section 41 of the controller 4 obtains the voice information input to the voice operation device 2 (step S202), and then determines whether or not the voice information obtained in step S202 has a sound volume which is equal to or higher than the first sound volume (step S203).

In a case where the operation control section 41 of the controller 4 determines that the voice information obtained in step S202 has a sound volume which is equal to or higher than the first sound volume (Yes in step S203), the operation control section 41 determines that the voice operation device 2 is operating normally (step S204), causes the output device 3 to output information indicating that the voice operation device 2 is operating normally (Step S205), and terminates the present program.

For example, the output device 3 may output the information indicating that the voice operation device 2 is operating normally in such a way that texture information stating "the voice operation device is operating normally" is output to (displayed on) a monitor or the like, or is output as the voice information from the voice output device 30 or the like.

On the other hand, in a case where the operation control section 41 of the controller 4 determines that the voice information obtained in step S202 has a sound volume which is lower than the first sound volume (No in step S203), the operation control section 41 determines that the voice operation device 2 is not operating normally (the voice operation device 2 has an abnormality) (step S206), causes the output device 3 to output information indicating that the voice operation device 2 is not operating normally (the voice operation device 2 has an abnormality) (Step S207), and terminates the present program.

Alternatively, the output device 3 may output information indicating that the voice operation device 2 is not operating normally (the voice operation device 2 has an abnormality) in such a way that texture information stating "the voice operation device has a failure" is output to (displayed on) a monitor or the like, or is output as the voice information from the voice output device 30 or the like.

The robot system 100 according to Embodiment 3 configured as described above can obtain the same advantages as those of the robot system 100 according to Embodiment 1.

In addition, in the robot system 100 according to Embodiment 3, the controller 4 is configured to conduct the sound volume detection test of the voice operation device 2.

In accordance with this configuration, it become possible to determine whether or not the voice operation device 2 is operating normally. In a case where a person such as the operator actually emits a loud voice such as a shout, or a big sound such as a collision noise of the robot 1 or other devices occurs, the operation of the robot 1 is changed properly in response to such a sound or noise.

By conducting the sound volume detection test as an emergency drill, the operator or the like pays attention disaster prevention.

Embodiment 4

In a robot system according to Embodiment 4, the controller is configured to change the operation of the robot, in a case where the voice operation device detects a voice with a sound volume which is equal to or higher than the first sound volume, while the robot is operating in a manual operation mode in which the robot operates in accordance with an operation command from the operator, or a modified automatic operation mode in which the operation of the robot operating in the automatic operation mode in which the robot operates in accordance with a preset task program is modified in accordance with the operation command from the operator, in the robot system according to any one of Embodiment 1 to Embodiment 3.

Hereinafter, an example of the robot system according to Embodiment 4 will be described with reference to FIG. 9. The configuration of the robot system according to Embodiment 4 is the same as that of the robot system according to Embodiment 1 and will not be described in detail.

[Operation and Advantages of Robot System]

Figure 9:
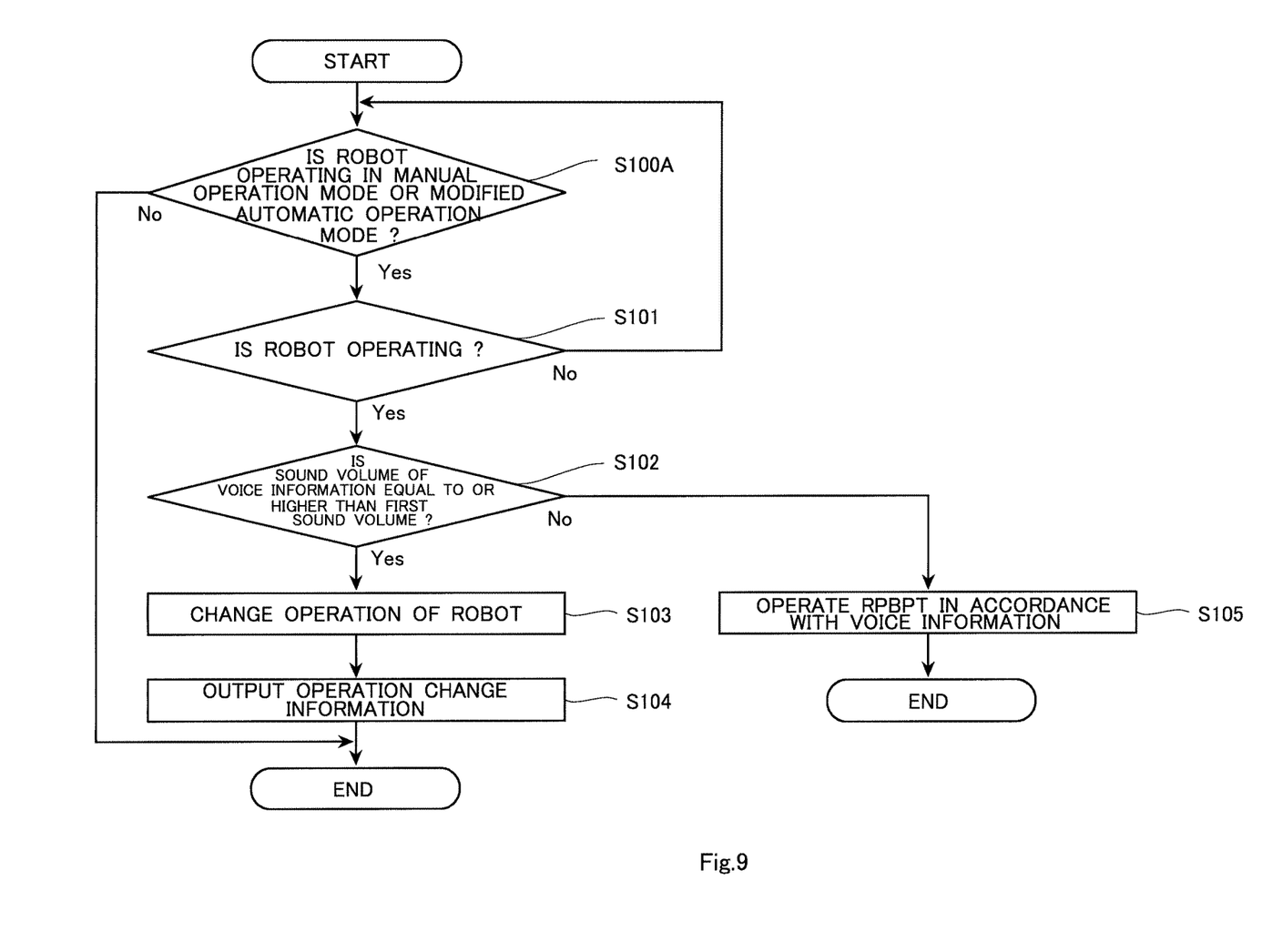
FIG. 9 is a flowchart showing an example of the operation of a robot system according to Embodiment 4.

FIG. 9 is a flowchart showing an example of the operation of the robot system according to Embodiment 4. The following operation takes place in such a manner that the processor of the controller 4 reads the program stored in the memory section of the controller 4 or the memory 5 and executes this program.

As shown in FIG. 9, the basic operation of the robot system 100 according to Embodiment 4 is the same as that of the robot system 100 according to Embodiment 1 and is different from the same in that step S100A is performed instead of step S100.

Specifically, the operation control section 41 of the controller 4 determines whether or not the robot 1 is operating in the manual operation mode or the modified automatic operation mode (step S100A). In a case where the operation control section 41 of the controller 4 determines that the robot 1 is not operating in the manual operation mode or the modified automatic operation mode, namely, the operation control section 41 of the controller 4 determines that the robot 1 is operating in the automatic operation mode (No in step S100A), the operation control section 4 terminates the present program. In a case where the controller 4 terminates the present program, the controller 4 executes the present program again, after passage of, for example, 50 msec.

On the other hand, in a case where the operation control section 41 of the controller 4 determines that the robot 1 is operating in the manual operation mode or the modified automatic operation mode (Yes in step S100A), the operation control section 4 performs step S101. After that, the operation control section 41 of the controller 4 performs the operations (processing) as in the robot system 100 according to Embodiment 1.

The robot system 100 according to Embodiment 4 configured as described above can obtain the same advantages as those of the robot system 100 according to Embodiment 1.

In particular, in the robot system 100 according to Embodiment 4, the controller 4 is configured to change the operation of the robot, in a case where the voice operation device detects a voice with a sound volume which is equal to or higher than the first sound volume, while the robot 1 is operating in the manual operation mode or the modified automatic operation mode.

In this configuration, the operation of the robot 1 can be changed in response to a voice emitted from the operator quickly in a case where the operator inputs a voice for the operation of the robot 1 by mistake, and the robot 1 operates in an undesired (unexpected) direction, while the operator is inputting a voice for the operation of the robot 1. This makes it possible to change the operation of the robot 1 earlier and more accurately, than in a case where the operation of the robot 1 is changed by the operator's operation (manipulation) of an emergency stop button or the like in a case where the robot 1 operates (moves) in an undesired direction.

Numerous modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention. Further, various inventions can be made by appropriately combining a plurality of constituents disclosed in the above-described embodiments.

INDUSTRIAL APPLICABILITY

A robot system and an operation method thereof of the present invention can change the operation of a robot in response to a loud voice such as a shout of a person such as an operator, or a big sound such as a collision noise of the robot, or the like. Therefore, the robot system and the operation method are useful in the fields of industrial robots.

REFERENCE SIGNS LIST 1 robot
2 voice operation device
3 output device
4 controller
11a first link member
11b second link member
11c third link member
11d fourth link member
11e fifth link member
11f sixth link member
12 end effector
15 base
20 switching unit
30 voice output device
40 receiver section
41 operation control section
42 output control section
51 task program
52 operation sequence information
100 robot system
JT1 first joint
JT2 second joint
JT3 third joint
JT4 fourth joint
JT5 fifth joint
JT6 sixth joint

The invention claimed is:
1. A robot system for use with an operator, the robot system comprising:
a robot including a plurality of joints;
a voice operation device configured to detect a voice of the operator and to receive a voice operation command that is input by the operator, the voice operation device including a switch configured to enable or disenable the voice operation command that is input to the voice operation device by the operator; and
a controller which controls an operation of the robot, the controller being configured to:
determine whether the detected voice has a sound volume that is equal to or greater than a first predetermined sound volume,
when the robot is operating, change the operation of the robot in response to the sound volume of the detected voice being equal to or greater than the first predetermined sound volume, and
when the voice operation command that is input to the voice operation device is disenabled by the switch, change the operation of the robot in response to the sound volume of the detected voice being equal to or greater than the first predetermined sound volume.

2. The robot system according to claim 1, further comprising:
a voice output device, wherein
the controller is configured to:
execute a sound volume detection test that causes the voice output device to output a voice with a sound volume which is equal to or higher than the first predetermined sound volume,
determine that the voice operation device is operating normally when the voice operation device detects the voice with the sound volume which is equal to or higher than the first predetermined sound volume, and
determine that the voice operation device has an abnormality when the voice operation device detects a voice with a sound volume which is lower than the first predetermined sound volume.

3. The robot system according to claim 1, wherein the controller is configured to:
change the operation of the robot, in a case where the voice operation device detects the voice with the sound volume which is equal to or higher than the first predetermined sound volume, while the robot is operating in: (i) a manual operation mode in which the robot operates in accordance with an operation command from the operator, or (ii) a modified automatic operation mode in which the operation of the robot operating in an automatic operation mode in which the robot operates in accordance with a preset task program is modified in accordance with the operation command from the operator.

4. The robot system according to claim 1, wherein the controller is configured to operate the robot at a speed which is lower than a preset first speed, in a case where the voice operation device detects the voice with the sound volume which is equal to or higher than the first predetermined sound volume, during the operation of the robot.

5. The robot system according to claim 1, wherein the controller is configured to stop the operation of the robot, in a case where the voice operation device detects the voice with the sound volume which is equal to or higher than the first predetermined sound volume, during the operation of the robot.

6. The robot system according to claim 1, wherein the controller is configured to operate the robot in a direction opposite to an operation direction of the robot which was operating before the voice operation device detects the voice with the sound volume which is equal to or higher than the first predetermined sound volume, in a case where the voice operation device detects the voice with the sound volume which is equal to or higher than the first predetermined sound volume, during the operation of the robot.

7. The robot system according to claim 1, wherein
the robot is provided with a driving motor which drives two link members connected to each other via the joint to move the two link members relative to each other, and
the controller is configured to reduce a gain of the driving motor, in a case where the voice operation device detects the voice with the sound volume which is equal to or higher than the first predetermined sound volume, during the operation of the robot.

8. A method of operating a robot system including: (i) a robot including a plurality of joints; (ii) a voice operation device configured to detect a voice of the operator and to receive a voice operation command that is input by an operator, the voice operation device including a switch configured to enable or disenable the voice operation command input to the voice operation device by the operator, and (iii) a controller that controls an operation of the robot, the method comprising:
- (A) determining whether the detected voice has a sound volume that is equal to or greater than a first predetermined sound volume,
- (B) when the robot is operating, changing the operation of the robot in response to the sound volume of the detected voice being equal to or greater than the first predetermined sound volume,
- (C) disenabling, by the switch, the voice operation command that is input to the voice operation device, wherein:
  when the voice operation command that is input to the voice operation device is disenabled by the switch, the operation of the robot is changed in response to the sound volume of the detected voice being equal to or greater than the first predetermined sound volume.

9. The method of operating the robot system according to claim 8, wherein
the robot system further includes a voice output device, and
the method further comprising:
- (D) causing the voice output device to output a voice with a sound volume which is equal to or higher than the first predetermined sound volume, determining that the voice operation device is operating normally, in a case where the voice operation device detects the voice with the sound volume which is equal to or higher than first predetermined sound volume, and determining that the voice operation device has an abnormality, in a case where the voice operation device detects a voice with a sound volume which is lower than the first predetermined sound volume.

10. The method of operating the robot system according to claim 8, wherein
step (B) is performed while the robot is operating in: (i) a manual operation mode in which the robot operates in accordance with the operation command from the operator, or (ii) a modified automatic operation mode in which the operation of the robot operating in an automatic operation mode in which the robot operates in accordance with a preset task program is modified in accordance with the operation command from the operator.

11. The method of operating the robot system according to claim 8, wherein
in step (B), the robot operates at a speed which is lower than a preset first speed, in a case where the voice operation device detects the voice with the sound volume which is equal to or higher than the first predetermined sound volume, during the operation of the robot.

12. The method of operating the robot system according to claim 8, wherein
in step (B), the operation of the robot is stopped, in a case where the voice operation device detects the voice with the sound volume which is equal to or higher than the first predetermined sound volume, during the operation of the robot.

13. The method of operating the robot system according to claim 8, wherein
in step (B), the robot operates in a direction opposite to an operation direction of the robot which was operating before the voice operation device detects the sound volume which is equal to or higher than the first predetermined sound volume, in a case where the voice operation device detects the voice with the sound volume which is equal to or higher than the first predetermined sound volume, during the operation of the robot.

14. The method of operating the robot system according to claim 8, wherein
the robot is provided with a driving motor which drives two link members connected to each other via the joint to move the two link members relative to each other, and
in step (B), the robot operates so that a gain of the driving motor is reduced, in a case where the voice operation device detects the voice with the sound volume which is equal to or higher than the first predetermined sound volume, during the operation of the robot.

15. The robot system according to claim 1, wherein
the first predetermined sound volume is set:
in a range between 65 dB and 90 dB, or
to a value that is a sum of 5 dB and a maximum value of a noise in a space in which: (a) the operator wearing the voice operation device is present, or (b) the voice operation device is placed.

16. The method of operating the robot system according to claim 8, wherein
the first predetermined sound volume is set:
in a range between 65 dB and 90 dB, or
to a value that is a sum of 5 dB and a maximum value of a noise in a space in which: (a) the operator wearing the voice operation device is present, or (b) the voice operation device is placed.

* * * * *